June 9, 1953   L. J. FICHTER   2,641,175
ELECTRIC TOASTER
Filed Dec. 20, 1947   4 Sheets-Sheet 1

INVENTOR.
Ludwig J. Fichter
BY Harry S. Dumars
ATTORNEY.

June 9, 1953  L. J. FICHTER  2,641,175
ELECTRIC TOASTER

Filed Dec. 20, 1947  4 Sheets-Sheet 2

INVENTOR.
Ludwig J. Fichter
BY
Harry S. Dumass
ATTORNEY.

June 9, 1953 — L. J. FICHTER — 2,641,175
ELECTRIC TOASTER
Filed Dec. 20, 1947 — 4 Sheets-Sheet 3

INVENTOR.
Ludwig J. Fichter
BY Harry S. Decarrt
ATTORNEY.

June 9, 1953 L. J. FICHTER 2,641,175
ELECTRIC TOASTER
Filed Dec. 20, 1947 4 Sheets-Sheet 4

INVENTOR.
Ludwig J. Fichter
BY
Harry S. Demass
ATTORNEY.

Patented June 9, 1953

2,641,175

UNITED STATES PATENT OFFICE 2,641,175

ELECTRIC TOASTER

Ludwig J. Fichter, Rockford, Ill., assignor to The Hoover Company, North Canton, Ohio, a corporation of Ohio Application December 20, 1947, Serial No. 792,909

13 Claims. (Cl. 99—329)

This invention relates to toasters and more particularly to a thermal timer for a toaster for timing the duration of successive toasting intervals whereby toast may be prepared done exactly as desired regardless of the number of toasting operations initiated in rapid succession or of the setting of the manual adjustment for adjusting the toaster for making light, medium, or dark toast.

Thermal timers of the heat-up type which time the duration of toasting intervals by the time it takes a thermal element to heat up to a predetermined temperature are known in the art. However, such timers have the inherent defect that they must be cooled again before a second toasting operation can be initiated. This requires the operator to wait until the thermal element has cooled before initiating a succeeding toasting operation or in the provision of some means for quickly cooling the thermally responsive element.

Thermal timers of the heat-up type also have the inherent defect that they tend to over-compensate. As the toaster is operated in rapid succession the toaster as a whole acquires more and more residual heat. This heat added to the heat of the main heaters toasts the bread faster and faster so that it is necessary to decrease the length of the toasting intervals after the first when the toaster is operated in rapid sucession. However, the thermal timer also heats up and acquires residual heat and at a faster rate than the toaster as a whole. This results in each successive toasting operation after the first being shortened more than is necessary to compensate for the residual heat acquired by the toaster and has been termed "over-compensation."

According to this invention a plurality of thermally responsive elements are moved successively into a position to be heated so that while one is being heated to perform its timing function the other is cooling to be conditioned properly for timing a succeeding toasting operation. This avoids the necessity for the operator to wait for the thermally responsive element to cool and the necessity for providing some means for quickly cooling the thermally responsive element. It also remedies the over-compensation tendency of the heat-up type thermal timer. A portion of the residual heat acquired by one thermally responsive element during its timing operation is dissipated while it is being cooled so that it will be conditioned properly for timing a succeeding toasting operation. While it is physically impractical to cool the thermally responsive element to its original cold temperature in the time allowed, sufficient residual heat is dissipated to just compensate for the residual heat acquired by the toaster as a whole to shorten each succeeding toasting operation after the first the correct amount to prepare toast of the same color regardless of the number of times the toaster is operated in rapid succession.

More specifically, according to this invention, the thermally responsive elements themselves act as a part of the mechanism for latching the toast carriers in toasting position. When the toast carriers move upwardly the thermally responsive element which has just acted as the timer is moved away from the heater so that it will immediately start to cool. Additionally, the thermally responsive element which is to perform the next toasting operation is not moved into heat exchange relationship with the heater until the carriers are again moved to toasting position. This will prevent the thermally responsive element from being pre-heated by the residual heat of the heaters. Further, according to this invention the indexing mechanism actuated by up and down movement of the toast carriers also forms a portion of the mechanism for latching the toast carriers in toasting position.

According to another feature of this invention a shield is manually moved so as to partially shield the thermally responsive element from receiving heat from the heaters so as to adjust the timer for making light, medium, or dark toast.

According to a modified form of this invention an auxiliary heater is provided for the active thermally responsive element which is energized simultaneously with the main heaters. In this modification, when the carriers are released for movement to receiving position a properly conditioned thermally responsive element is moved into operative position but a shield carried by the toast carriers is automatically positioned between the thermally responsive element and the auxiliary heater to prevent the thermally responsive element from being preheated by the residual heat of the auxiliary heater. Also according to the modified form of the invention the heater is manually moved toward and away from the thermally responsive element in adjusting for light, medium, or dark toast.

Other objects and advantages of this invention will become apparent as the description proceeds when taken in connection with the accompanying drawings in which.

Figure 1:
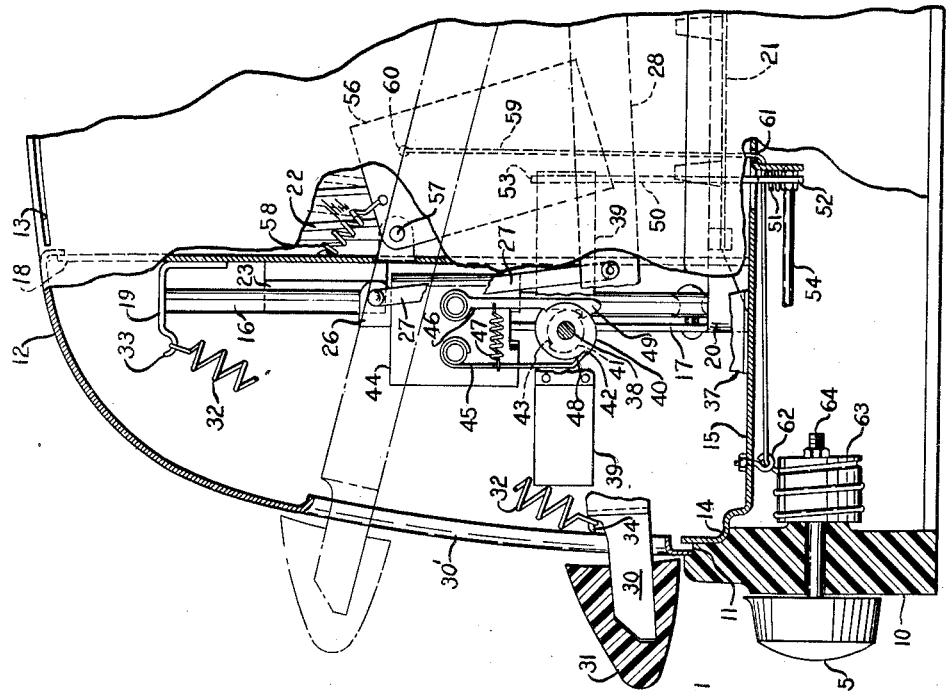
Figure 1 is a side plan view of a toaster with certain parts of the toaster broken away to show the details of the timing mechanism.

Referring to the drawings the reference numeral 10 represents a base for the toaster of this invention. Supported on a peripheral ledge 11 of base 10 is the lower edge of an appearance housing 12 having bread receiving slots 13 in its top. Supported on a second peripheral ledge 14 inwardly of the ledge 11 is a supporting plate 15 which supports the entire mechanism within the appearance housing 12.

Rigidly secured at their lower ends to the supporting plate 15 and extending vertically upwardly therefrom are a pair of guide rods 16 for guiding a carriage plate 17 for vertical reciprocation in a manner well known in the art. At their upper ends the rods 16 are secured by bracket 19 to a partition 18 which divides the interior of the toaster into a mechanism compartment and a toasting oven.

Struck rearwardly from the carriage plate 17 are a pair of arms 20 to which are attached the bread carriers 21 lying immediately below the bread receiving slots 13 in the appearance housing 12. Positioned on opposite sides of the bread carriers 21 in a manner well known in the art are heaters 22 which are adapted to be energized by an on-off switch 23. The switch 23 is nommally open and is adapted to be closed by depressing a plunger 24 adapted to be actuated by a cam lug 25 extending rearwardly from the carriage plate 17, as the carriage plate 17 is moved to downward position.

Extending outwardly and rearwardly from the upper edge of the carriage plate 17 are a pair of arms 26 to which are pivoted the upper ends of a pair of links 27, the lower ends of which are pivoted to a pair of manipulating arms 28.

At their rear ends the manipulating arms 28 are pivoted to the side walls of the toasting oven and at their forward ends, at 30, they are extended through a vertical slot 30' in the appearance housing 12. A manipulating handle 31 is attached to the forward extensions 30 exteriorly of the appearance housing 12.

The arms 28, carriage plate 17, the bread carriers 21 are biased to upward or receiving position by a spring 32 anchored at its upper end to a hook 33 on bracket 19 and at its lower end to hooks 34 on the forward extensions 30 of the manipulating arms 28. The partition 18 is provided with a pair of vertically extending slots 35 and 36 for the vertical reciprocation of the arms 20 and 28 respectively.

Supported by the supporting plate 15 and extending upwardly therefrom are a pair of brackets 37. At their upper ends the brackets 37 rotatably support a shaft 38 to which is rigidly attached the inner ends of a pair of bimetallic elements 39. Also rigid with the shaft 38 are a pair of indexing ratchets 40 and 41 each having a pair of abutments 42 and 43 respectively. The abutments 42 are spaced 180 degrees from each other on the periphery of ratchet 40 and the abutments 43 are spaced 180 degrees from each other on the periphery of ratchet 41 and offset 90 degrees from the abutments 42.

Extending rearwardly and then forwardly in a reverse bend from the carriage plate 17 so as to clear the inner bracket 37 is a member 44 which pivotally carries the upper ends of a pair of indexing pawls 45 and 46, the lower ends of which are biased toward each other by a spring 47. The indexing pawl 45 has an inturned end 48 and the indexing pawl 46 has a hook 49 which cooperate with the abutments 42 and 43 respectively as will be explained presently.

Pivotally mounted on lugs extending downwardly from the supporting plate 15 is a latch lever 50 which is spring-biased to latching position by a spring 51. The lever 50 has a toe 52 which engages the underside of the supporting plate 15 to form a stop to hold the latch 50 in its proper position to cooperate with the active bimetallic element 39 as will be explained hereinafter. At its upper end the latch 50 has a hook 53 which engages over the upper edge of the active bimetal 39 to latch the carriage plate 17 in toasting position. The latch 50 is adapted to be rotated clockwise as viewed in Fig. 2 by a shaft 54 which pivotally supports the latch and extends through the front of the base 10 where a knob 55, as shown in Fig. 3, is attached thereto.

A shield 56 is pivotally supported on the partition 18 at 57 and is spring-biased counter-clockwise as viewed in Fig. 1 by a spring 58. A heat resisting transmission cord 59 is attached to the shield 56 at 60. The cord 59 extends downwardly through an opening 61 in the supporting plate 15 and then forwardly through a guide 62 to a drum 63 rotatably mounted by a shaft 64 extending through the front of the base 10 and carrying a manipulating knob 65 exteriorly of the base 10.

Figure 2:
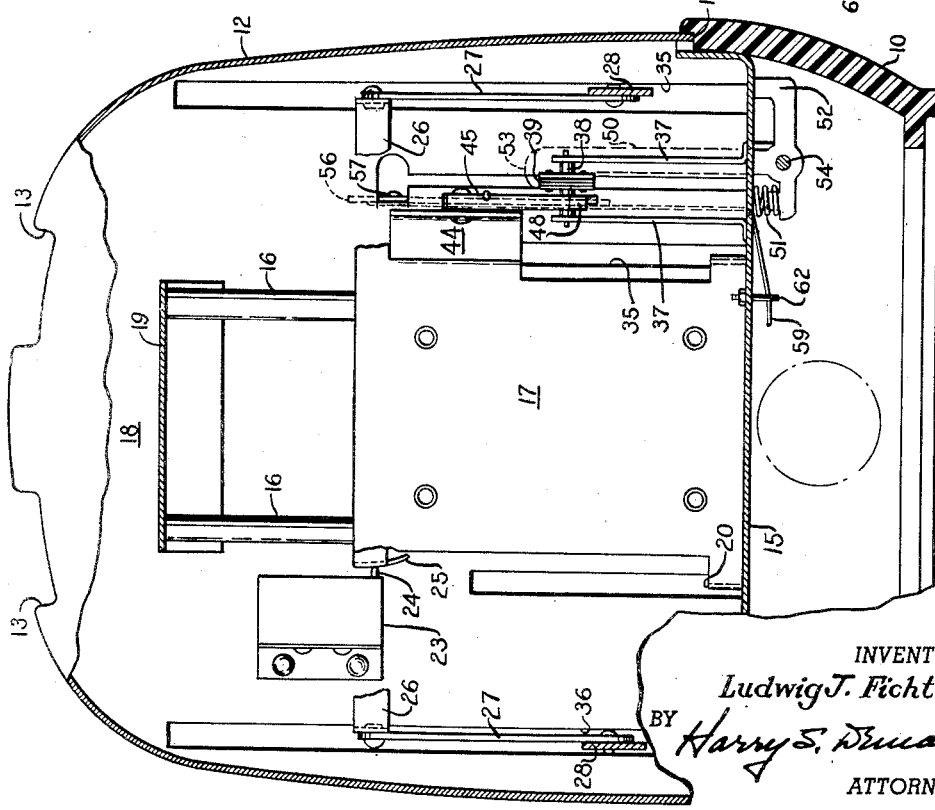
Figure 2 is a front plan view of the toaster of Fig. 1 with the casing of the toaster broken away to show the details.
Figure 3:
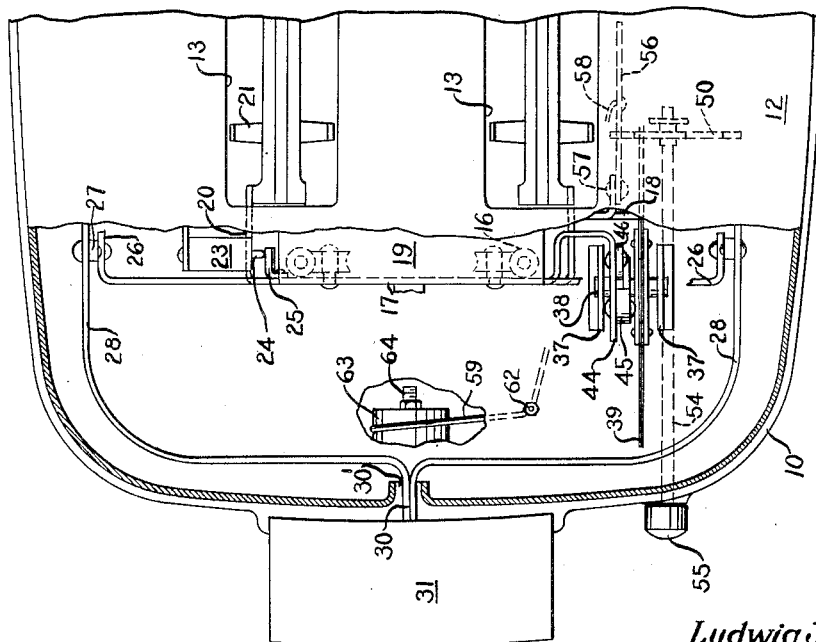
Figure 3 is a top plan view of the toaster and timer of Fig. 1.

*Operation of Figures 1, 2, and 3*

Bread is inserted through the slots 13 so as to rest upon the carriers 21. The manipulating handle 31 is moved downwardly so as to move carriage plate 17 downwardly and position the bread carriers between the heaters 22. This will cause the cam 25 to engage the plunger 24 and close the switch 23 so as to energize the heaters 22.

As will become evident the bimetallic elements 39 are always positioned in a vertical position when the carriage plate 17 is in its upward position. Upon movement of the carriage plate 17 downwardly the end 48 of the indexing pawl 45 will engage one abutment 42 of indexing ratchet 40 and rotate the indexing ratchet 90° to position the bimetallic elements 39 in a horizontally extending position. This will move one of the bimetallic elements 39 to a position adjacent one of the heaters 22 and beneath the hook 53 of the latch 50. The same movement will cause the hook 49 of the indexing pawl 46 to engage beneath one of the abutments 43 of the indexing ratchet 41.

Upon release of the manipulating handle 31 the spring 32 will tend to move the carriage plate 17 upwardly. This will cause the hook 49 of the indexing link 46 to tend to rotate the shaft 38 counter-clockwise as viewed in Fig. 1. However, the active bimetallic element 39 is positioned below the hook 53 of the latch 50 and will prevent counter-clockwise movement of the shaft 38. Thus, since the indexing pawl 46 is carried by the carriage plate 17, the carriage plate 17 will be latched in its downward position.

From the foregoing it is to be noted that the active bimetallic element 39 and the indexing mechanism in the form of the indexing pawl 46 form a part of the mechanism for latching the carriage plate 17 in downward position.

Heat from the heaters 22 will perform the toasting function and will also heat the active bimetallic element 39. By the time the bread has been properly toasted to the desired degree the active bimetallic element 39 will have been heated sufficiently to cause its free end to flex to the left as viewed in Fig. 2 until it moves from beneath the hook 53 of the latch 50 and free the carriage plate 17 for upward movement under the bias of the spring 32.

Upward movement of the carriage plate 17 and correspondingly the indexing pawl 46 will rotate the shaft 38 counterclockwise as viewed in Fig. 1 so as to position the bimetallic elements 39 in a vertically extending position. It is to be noted that that movement will move the active bimetallic element 39 out of heat exchange relationship with the heaters 22 but will not move the inactive bimetallic element 39 into heat exchange relationship with the heaters 22 so that the inactive bimetallic element will not be preheated and the active bimetallic element 39 will immediately begin to cool.

A second toasting operation may be immediately initiated by inserting new slices and moving the manipulating handle 31 downwardly as before. The previously inactive bimetallic element 39 will now be moved into heat exchange relationship with the heaters 22 by engagement of the end 48 of the indexing pawl 45 with one of the abutments 42 as previously described.

During the first toasting operation the toaster as a whole acquired residual heat so that the toast will be prepared faster than for the first toasting operation. However, the inactive bimetallic element 39 will also have acquired some residual heat and upon being heated by the heaters 22 will warp and move from beneath the hook 53 to release the carriage plate 17 sooner than for the first toasting operation so as to compensate for the added residual heat acquired by the toaster as a whole.

The bimetallic element 39 which previously acted as the timer is being cooled during this period. If a third toasting operation is immediately begun, after the termination of the second, the operation will be the same as before except that the inactive bimetallic element 39 during the second toasting operation will not be cooled to as low a temperature as it was originally starting with a cold toaster but will have acquired some residual heat. This residual heat will be just sufficient to terminate the third toasting operation faster than the second sufficient to compensate for the added residual heat acquired by the toaster as a whole. However, since the bimetallic elements 39 are cooled between operative periods sufficient residual heat will be dissipated from the bimetallic elements 39 to prevent them from operating too fast. By proper design it has been found that the heat dissipated by the thermal responsive elements 39 during inactive periods will prevent over-compensation of the bimetallic elements. That is, the timer will operate faster for the third toasting operation than for the second but not sufficiently fast to operate the latch release mechanism before the toast is done properly.

If dark toast is desired the knob 65 is rotated to wind more of the cord 59 on the drum 63 so as to pivot the shield 56 clockwise as viewed in Fig. 1 and move the shield 56 between the heaters 22 and the active bimetallic element 39. It will then take longer for the active bimetallic element 39 to reach its releasing position with the result that dark toast will be prepared.

If light or medium toast is desired the knob 65 is rotated in the opposite direction whereby the spring 58 will pivot the shield 56 counterclockwise and expose more of the active bimetallic element 39 to the heat radiated from the heaters 22 to heat the active bimetallic element 39 faster and shorten the toasting period so that light or medium toast will result.

If at any time it is desired to stop the toasting operation it is only necessary to rotate the knob 55 clockwise, as viewed in Fig. 3, to move the hook 53 from above the upper edge of the active bimetallic element 39 and the carriers will move to receiving position as previously described.

Figure 4:
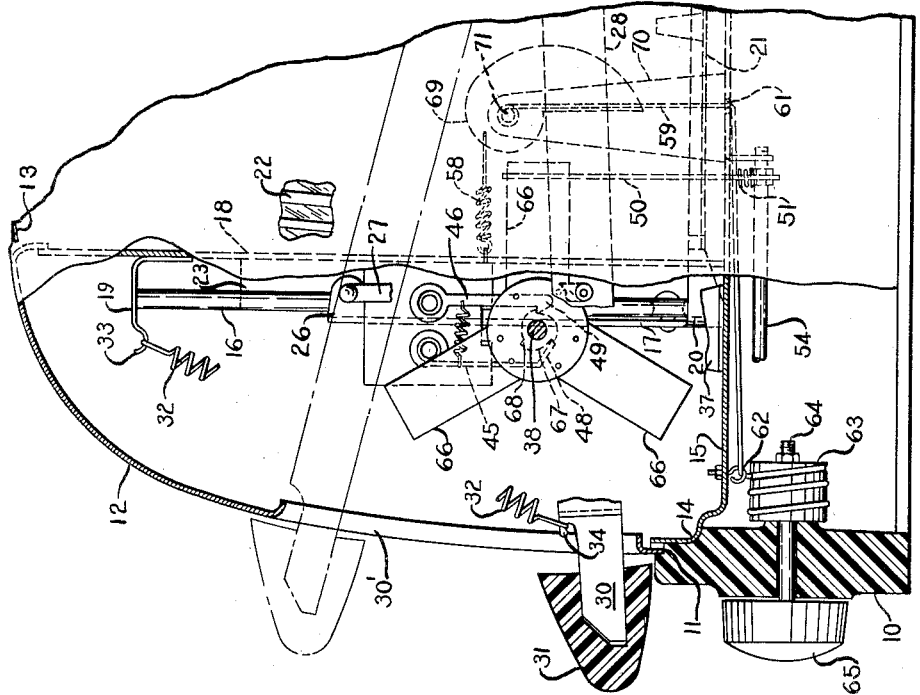
Figure 4 is a side plan view of a modified form of the timer with the parts of the toaster broken away to show the details of the timer.

Referring to the modification of Fig. 4, where the parts are the same as in the modification of Figs. 1 to 3, inclusive, they have been given the same reference numerals. The parts which are the same as in the modification of Figs. 1 to 3, inclusive, have not been redescribed but only the modified construction.

This modification differs over that of the modification of Figs. 1 to 3, inclusive, in that the shaft 38 carries three bimetallic elements 66 spaced 120° about the shaft 38 and a single indexing ratchet 67 having three abutments 68 also spaced 120° about the pin 38 and in radial alignment with the bimetallic elements 66.

A modified shield 69 is pivotally supported on a pedestal 70, extending upwardly from the supporting plate 15, by a pin 71 about which the cord 59 is wrapped so that when the knob 65 is rotated the pin 71 and shield 69 are rotated to shield more or less of the active bimetallic element 66 from the heat of the heaters 22 the same as in the modification of Figs. 1 to 3, inclusive.

The operation of this modification is substantially the same as that of the modification of Figs. 1 to 3, inclusive, except that upon upward movement of the carriage plate 17 the hook 49 of the indexing pawl 46 will engage one of the abutments 68 to rotate the pin 38 approximately 30° or to a position where the abutment 68 is positioned below the end 48 of indexing pawl 45. That will move the previously active bimetallic element 66 from heat exchange relationship with the heaters 22 but will move neither of the previously inactive bimetallic elements 66 into heat exchange relationship with the heaters 22. At this time the heaters 22 are deenergized and while some residual heat will be transmitted to the previously inactive bimetallic element 66 this will not be material because upon downward movement of carriage plate 17 to initiate a succeeding toasting operation the end 48 of the indexing pawl 45 will engage the same abutment 68 and rotate the shaft 38 approximately 90° to move a completely reconditioned bimetallic element 66 into operative or active position with its free end engaged beneath the hook 53 of latch 50.

Figure 6:
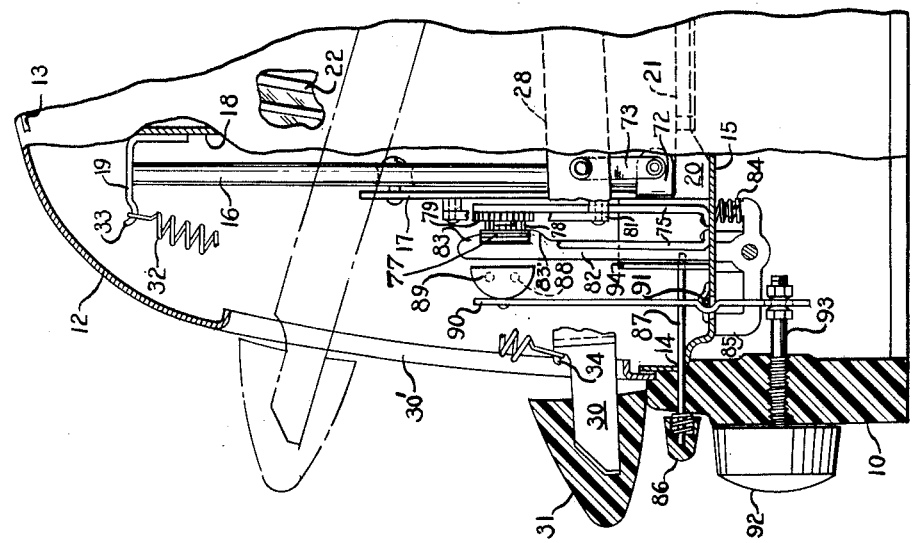
Figure 6 is a side plan view of the toaster and timer of Fig. 5.
Figure 5:
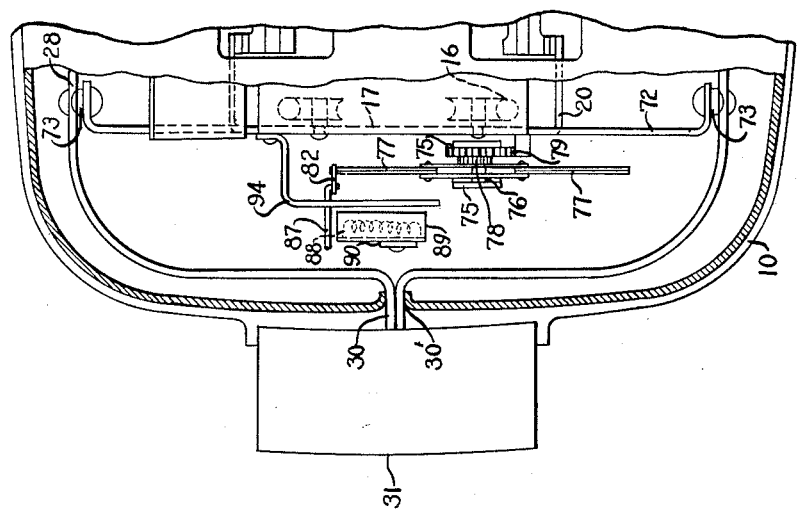
Figure 5 is a top plan view of a second modified form of timer with the parts broken away to show the details.
Figure 7:
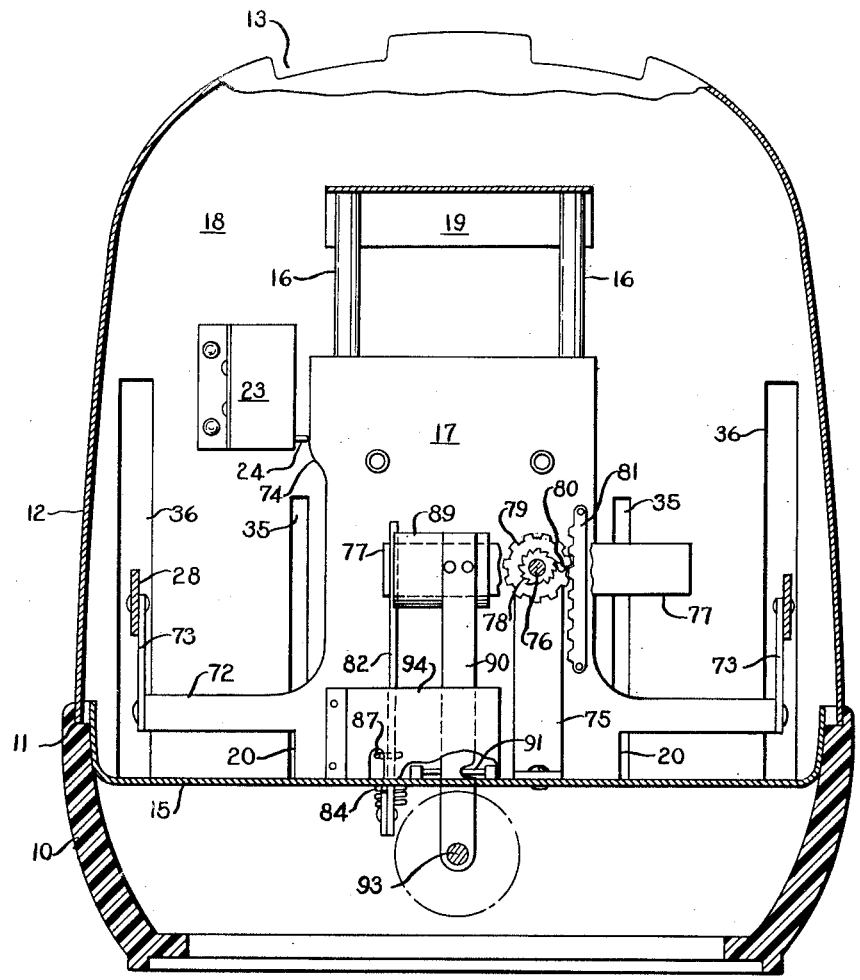
Figure 7 is a front plan view of the toaster and timer of Fig. 5.

In the modification of Figs. 5 to 7, inclusive, the toaster is substantially the same as that of the modification of Figs. 1 to 3, inclusive. Where the parts are the same they have been given the same reference characters as in Figs. 1 to 3, inclusive, and only the modified construction will be described.

In this modification, the carriage plate 17, near its lower end, is provided with outwardly and rearwardly extending arms 72. The lower ends of links 73 are pivoted to the rearwardly extending ends of the arms 72 and at their upper ends the links 73 are pivoted to the manipulating arms 28. The edge of the carriage plate 17 has a cam 74 to contact the plunger 24 and close the switch 23 when the carriage plate 17 is moved downwardly.

Extending upwardly from the supporting plate 15 are a pair of standards 75 which rotatably support a shaft 76 at their upper ends. Rigidly attached to the shaft 76 are a pair of bimetallic elements 77 spaced 180° and normally positioned in a horizontally extending position. Also rigidly attached to the shaft 76 is a ratchet wheel 78 which cooperates with a pinion 79 by means of a pawl 80. Attached to the front of the carriage plate 17 is a rack 81 which cooperates with the pinion 79 in a manner to be described.

Pivoted to lugs extending downwardly from the supporting plate 15 is a latch lever 82, having a hook 83 adapted to overlie the upper edge of and an abutment 83' adapted to engage the underside of one of the bimetallic elements 77 in a manner to be hereinafter described. The lever 82 is biased clockwise as viewed in Fig. 6 by a spring 84 which causes the toe 85 of the latch 82 to engage the underside of the supporting plate 15 so that the latch 82 will always return to latching position. The latch 82 may be moved counter-clockwise to manually release the carriers for upward movement by a knob 86 attached to the latch 82 by a rod 87 extending forwardly through the front of the base 10.

An auxiliary heater 88 connected in series with the main heaters 22 is carried by a reflector 89 positioned immediately in front of one of the bimetallic elements 77. The reflector 89 and the auxiliary heater 88 are carried by a lever 90 pivoted intermediate its ends at 91 to the supporting plate 15. A knob 92 positioned exteriorly of the front of the base 10 is rigidly attached to the shaft 93 screw threaded through the front of the base 10. The inner end of the shaft 93 is rotatably attached to the lower end of the lever 90 in any suitable manner such as by the nuts as shown in Fig. 6. Secured to the carriage plate 17 and positioned so as to lie between the heater 88 and one of the bimetallic elements 77 when the carriage plate 17 is in upward position is a shield 94. The surface of the shield 94 facing the heater 88 may be made reflective so that the shield 94 will not readily absorb heat from the heater 88.

*Operation of the modification of Figures 5 to 7, inclusive*

Bread is inserted through the openings 13 and the manipulating handle 31 is moved downwardly as in the first modification. This will cause the cam 74 to engage the plunger 24 of switch 23 to close the switch 23 and simultaneously energize the main heaters 22 and the auxiliary heater 88. The teeth of the rack 81 will engage the teeth of the pinion 79 and rotate it clockwise. However, the pawl 80 will merely ride over the teeth of the ratchet 78 so that the shaft 76 will remain stationary and the bimetallic elements 77 will remain in horizontal position. The hook 83 of the latch 82 holds the bimetallic elements 77 in their horizontal position during this movement.

When the manipulating handle 31 is released the spring 32 will tend to move the carriage plate 17 upwardly but since the pawl 80 will engage with the teeth of the ratchet 78 and the shaft 76 is held against counter-clockwise rotation by the abutment 83' engaging one of the bimetallic elements 77 the carriage plate 17 will be latched in its lowered position.

Heat from the main heaters 22 will perform the toasting function and heat from the auxiliary heater 88 will be transmitted to the active bimetallic element 77 and cause it to slowly flex toward the right as viewed in Fig. 5. By the time the main heaters have performed the toasting function the free end of the active bimetallic element 77 will have moved out of engagement with the abutment 83' so that the carriage plate 17 will move upwardly under the bias of the spring 32.

Movement of the carriage plate 17 to upper position comes about by reason of the fact that movement of the free end of the bimetallic element 77 from above the abutment 83' will permit the shaft 76 to be rotated freely by the action of the rack 81, pinion 79 and pawl 80 until the free end of the previously inactive bimetallic element 77 engages the abutment 83' of latch lever 82 which will arrest further upward movement of the carriage plate 17.

Upward movement of the carriage plate 17 will cause the shield 94 to be moved between the auxiliary heater 88 and the free end of the cool bimetallic element 77 so that residual heat from the auxiliary heater 88 will not be transmitted to the cool bimetal 77.

A second toasting operation may be immediately initiated by inserting new slices of bread through the openings 13 and again moving the manipulating handle 31 to downward position as before. The operation will be the same as for the first toasting operation except that the previously inactive bimetallic element 77 will have acquired some residual heat from the main heaters so that it will be heated quicker by the auxiliary heater 88 and moved to its releasing position sooner than for the first toasting operation. The residual heat acquired by the inactive bimetallic element 77 during the first toasting operation will be just sufficient to compensate for the residual heat acquired by the toaster as a whole so that for the second toasting operation the toast will be done to the same degree of brownness as for the first.

During the second toasting operation the previously active bimetallic element 77 is being cooled to recondition it for a succeeding timing operation. If a third toasting operation is initiated immediately after the first the operation will be the same as before except that the bimetallic element 77 which was active for the first toasting operation will not be cooled to its original cold condition and will therefore terminate the third toasting operation faster than the second. Again this will tend to compensate for the additional residual heat acquired by the toaster as a whole and for the third toasting operation the toast will be done to the same degree of brownness as for the first and second.

If dark toast is desired the knob 92 will be rotated to pivot the lever 90 so as to move the reflector and auxiliary heater 88 farther away from the active bimetallic element 77 so that it will take a longer time for the auxiliary heater to heat the bimetallic element 77 which will prolong each toasting interval and thus produce dark toast. If light or medium toast is desired the knob 92 will be rotated in the opposite direction to move the reflector 89 and auxiliary heater 88 closer to the active bimetallic element 77 so as to shorten the toasting intervals and thus produce light or medium toast.

According to the modification of Figs. 5 to 7, inclusive, the thermally responsive timers themselves and the latch mechanism forms a stop for arresting upward movement of the toast carriers.

If at any time during a toasting operation it is desired to stop the toasting operation the knob 86 is pulled outwardly so as to pivot the latch 82 counter-clockwise as viewed in Fig. 6 so as to move the abutment 83' from beneath the lower edge of the active bimetallic element 77 so as to release the carriage plate 17 for upward movement.

From the foregoing it can be seen that this invention provides a timer for a toaster having a plurality of thermally responsive elements which are sequentially brought into operative position properly conditioned for timing a succeeding toasting operation in which the thermally responsive elements themselves and the indexing mechanism for bringing them into operative position form a portion of the mechanism for latching the carriers in toasting position.

Additionally, it will be apparent that upward movement of the carriers always moves a previously active thermally responsive element away from its heater so that it will have a longer time to cool and thus be reconditioned for timing a succeeding toasting operation.

While I have shown but three modifications of my invention it is to be understood that these modifications are to be taken as illustrative only and not in a limiting sense. I do not wish to be limited to the particular structure shown and described but to include all equivalent variations thereof except as limited by the scope of the claims.

I claim:

1. A toaster comprising, bread carriers movable from receiving to toasting position and being spring-biased to receiving position, a thermal timer for timing the duration of successive toasting intervals, heating means, said timer including a plurality of thermally responsive elements to act successively to time succeeding toasting intervals, each of said thermally responsive elements being movable from a position remote from said heating means to a position to be heated thereby, means for moving said carriers to toasting position, means for latching said carriers in toasting position, means actuated by the active of said thermally responsive elements for releasing said latching means to permit said carrier to return to receiving position, means actuated by the return of said carriers to receiving position for moving the active thermally responsive element away from said heating means and an inactive thermally responsive element to an intermediate position and means actuated by a second movement of said carriers to toasting position for moving said inactive thermally responsive element into a position to be heated by said heating means.

2. A toaster comprising: a base; bread carriers movable from receiving to toasting position; spring means for biasing said carriers to receiving position; heating means; means for moving said carriers to toasting position and means for holding said carriers in toasting position; said holding means including a rotatable shaft carried by said base, indexing means carried by said carriers and a latch carried by said base, said shaft carrying a plurality of bimetallic elements adapted to time successive toasting intervals, each of said bimetallic elements having a free end, said indexing means including means movable with said shaft and means movable with said carriers operable to move one of said bimetallic elements into a position to be heated by said heating means with its free end engaging said latch when said carriers are moved to toasting position, the arrangement being such that the action of said spring means biasing said carriers to receiving position tends to rotate said shaft against the holding action of said latch and movement of the free end of said one bimetallic element to its hot position moves it from engagement with said latch to permit said spring means to move said carriers to receiving position and rotate said shaft so as to move said one bimetallic element away from said heating means.

3. A toaster comprising: a base; bread carriers movable from receiving to toasting position; spring means for biasing said carriers to receiving position; heating means; means for moving said carriers to toasting position and means for holding said carriers in toasting position, said holding means comprising a shaft rotatably mounted adjacent said base, a plurality of thermal timers carried by said shaft, indexing ratchet means carried by said shaft, indexing pawl means carried by said carriers and a latch mounted on said base for engagement with the free end of one of said thermal timers so as to hold said shaft against rotation, said ratchet and pawl means being so constructed and arranged that said spring means tends to rotate said shaft against the holding action of said latch, each of said thermal timers having a free end movable from a cold position to a hot position upon being heated and back to its cold position upon cooling, said indexing ratchet and pawl means being operable to move one of said thermal timers into an active position to be heated by said heating means upon movement of said carriers to toasting position, the arrangement being such that movement of the free end of the active timer to its hot position will disengage the free end thereof from said latch to cause said spring means to rotate said shaft to move the active timer away from said heating means and permit movement of said carriers to receiving position.

4. A toaster comprising, bread carriers movable from receiving to toasting position and spring-biased to receiving position, timing means, heating means, said timing means including a plurality of bimetallic elements to successively time succeeding toasting intervals, each of said bimetallic elements being mounted for movement from an inactive position remote from said heating means to an active position adjacent said heating means, means for moving said carriers to toasting position, indexing means including means movable with said carriers coacting with means movable with said mounting means to move one of said elements to a position to be heated by said heating means, a latch cooperating with the active of said thermally responsive elements for holding said carriers in toasting position, the arrangement being such that heating of the active of said thermally responsive elements releases said carriers for movement to receiving position, said indexing means including means for moving the active of said elements away from said heating means as said carriers move to receiving position, and return movement of said carriers to toasting position operates said indexing means to bring an inactive of said thermally responsive elements into cooperating engagement with said latch.

5. A toaster comprising, bread carriers movable from receiving to toasting position, spring means for biasing said carriers to receiving position, heating means, three thermal timers for timing the duration of succeeding toasting intervals, said timers being successively movable into a position to be heated by said heating means and to two positions remote from said heating means, means for moving said carriers to toasting position, means actuated by movement of said carriers to toasting position for moving a previously cooled one of said timers into a position to be heated by said heating means, for energizing said heating means and for moving the other two of said timers to a position remote from said heating means, means for latching said carriers in toasting position including said one timer, means actuated by the heating of said one timer for releasing said carriers for movement to receiving position, means actuated by movement of said carriers to receiving position for deenergizing said heating means, for moving said one timer away from said heating means and for moving the other timers toward said heating means and means actuated by a second movement of said carriers to toasting position for reenergizing said heating means, moving said second timer into a position adjacent said heating means and for moving said third timer into another position closer to said heating means.

6. A toaster comprising, bread carriers movable from receiving to toasting position and spring biased to receiving position, timing means, heating means, said timing means including a plurality of thermally responsive elements to successively time succeeding toasting intervals, each of said thermally responsive elements being mounted for movement from an inactive position remote from said heating means to an active position adjacent said heating means so as to be heated thereby, means for moving said carriers to toasting position, a latch cooperating with the active of said thermally responsive elements for holding said carriers in toasting position, indexing means including means actuated by movement of said carriers to toasting position cooperating with means movable with said elements for moving one of said thermally responsive elements into active position adjacent said heating means and into engagement with said latch means to latch said carriers in toasting position, the arrangement being such that the heating of the active of said thermally responsive elements releases said carriers for movement to receiving position and means coacting with said indexing means and operable upon movement of said carriers to receiving position to move the active of said thermally responsive elements away from its active position adjacent said heating means.

7. A toaster comprising, bread carriers movable from receiving to toasting position and spring-biased to receiving position, timing means, heating means, said timing means including a pair of bimetallic elements for successively timing succeeding toasting intervals, indexing means for successively moving one of said bimetallic elements from an inactive position remote from said heating means to a first intermediate inactive position and then to an active position adjacent said heating means so as to be heated thereby and for moving the other of said bimetallic elements from said active position to a second intermediate position and then to said remote inactive position, means for moving said carriers to toasting position and means including the active of said bimetallic elements for latching said carriers in toasting position, the arrangement being such that heating of the active of said bimetallic elements releases said carriers for movement to receiving position, said indexing means including means movable with said carriers and operable upon movement of said carriers to receiving position to move the active element to said second intermediate position and the inactive bimetallic element to said first intermediate position and upon movement of said carriers to toasting position to move the previously inactive bimetallic element into its active position and the previously active bimetallic element into its remote inactive position.

8. In a toaster comprising, a supporting frame, a bread carrier movably carried by said frame for movement from receiving to toasting position, means for biasing said carrier to receiving position, heating means, a thermal timer, a support for movably mounting said timer on said frame for movement of said timer from a first position remote from said heating means to a second position adjacent thereto, an abutment on said frame in a position to be engaged by said timer as it is moved to said second position, indexing means operative upon movement of said carrier to toasting position to move said timer against said abutment, said indexing means including means coacting with said timer and abutment to hold said carrier in toasting position against the action of said biasing means, said last mentioned means being mounted on said carrier for movement therewith, and said timer upon being heated being constructed to move out of engagement with said abutment to release said carrier for movement to receiving position.

9. A toaster according to claim 8 in which said indexing means coacts with said biasing means to move said timer to a position remote from said heating means as said carrier moves to receiving position.

10. A toaster comprising; a supporting frame; a bread carrier movably carried by said frame for movement from receiving to toasting position; means for biasing said carrier to receiving position; heating means; a thermal timer; a support for movably mounting said timer on said frame for movement of said timer from a first position remote from said heating means to a second position adjacent said heating means; an abutment on said frame in a position to be engaged by said timer as it is moved to said second position; first indexing means associated with said support; second indexing means carried by said carrier; said second indexing means coacting with said first indexing means to move said timer from its first to its second position as said carrier moves to toasting position; said first and second indexing means, said abutment and said timer coacting to hold said carrier in toasting position and said timer upon being heated being constructed to move out of engagement with said abutment to release said carrier for movement to receiving position.

11. A toaster according to claim 10 in which said first and second indexing means coact to move said timer to a position remote from said heating means as said carrier moves to receiving position.

12. A toaster comprising, a supporting frame, a bread carrier movably carried by said frame for movement from receiving to toasting position, means for biasing said carrier to receiving position, heating means, a thermal timer, a rotatable support rotatably mounting said timer on said supporting frame for movement from a first position remote from said heating means to a second position adjacent thereto, an abutment mounted on said frame and positioned to be engaged by said timer and form a stop therefor as the timer is moved to said second position, indexing means carried by said rotatable support, a pawl carried by said carrier and engageable with said indexing means to move said timer from its first position to its second position as said carrier is moved to toasting position, a second pawl engageable with said indexing means and coacting with said timer and abutment for holding said carrier in toasting position, said timer upon being heated being constructed to move out of engagement with said abutment to release said carrier for movement to receiving position.

13. A toaster according to claim 12 in which said second pawl coacts with said indexing means to move said timer away from said heating means as said carrier moves to receiving position.

LUDWIG J. FICHTER.

References Cited in the file of this patent

UNITED STATES PATENTS

| Number | Name | Date |
|---|---|---|
| 1,908,683 | Browning | May 16, 1933 |
| 1,988,230 | Avery | Jan. 15, 1935 |
| 2,132,622 | Ireland | Oct. 11, 1938 |
| 2,162,899 | Sardeson | June 20, 1939 |
| 2,196,394 | Ireland | Apr. 9, 1940 |
| 2,439,017 | Meyers | Apr. 6, 1948 |

FOREIGN PATENTS

| Number | Country | Date |
|---|---|---|
| 464,861 | Great Britain | Apr. 19, 1937 |